(12) United States Patent
Kaminade et al.

(10) Patent No.: US 9,463,796 B2
(45) Date of Patent: Oct. 11, 2016

(54) DRIVING ASSISTANCE APPARATUS

(71) Applicant: TOYOTA JIDOSHA KABUSHIKI KAISHA, Toyota-shi, Aichi (JP)

(72) Inventors: Takuya Kaminade, Susono (JP); Kiyoto Hanita, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/708,789

(22) Filed: May 11, 2015

(65) Prior Publication Data

US 2015/0353081 A1 Dec. 10, 2015

(30) Foreign Application Priority Data

Jun. 4, 2014 (JP) ................. 2014-116212

(51) Int. Cl.
*G05D 1/00* (2006.01)
*G08G 1/16* (2006.01)
*B60W 30/00* (2006.01)
*B60W 30/08* (2012.01)
*G01S 13/93* (2006.01)
(Continued)

(52) U.S. Cl.
CPC .......... *B60W 30/08* (2013.01); *B60W 30/0953* (2013.01); *B60W 30/0956* (2013.01); *G01S 13/931* (2013.01); *B60W 2550/30* (2013.01); *G01S 13/867* (2013.01); *G01S 2013/9332* (2013.01); *G01S 2013/9353* (2013.01)

(58) Field of Classification Search
CPC .... B60W 30/08; B60W 30/09; B60W 50/14; B60W 30/06; G01S 13/931; G08G 1/165; G05D 1/0246; B60Q 9/008; H04N 13/0253; B60R 11/04; G06K 9/00805

USPC .......... 701/1, 22, 41, 42, 400, 533; 382/103; 340/907; 903/930; 348/47, E13.074
See application file for complete search history.

(56) References Cited

U.S. PATENT DOCUMENTS 6,862,527 B2 * 3/2005 Okamura ................ G01S 7/412
340/435
7,739,022 B2 * 6/2010 Kobayashi ................ B60T 7/22
180/282
(Continued)

FOREIGN PATENT DOCUMENTS

JP 2007-017294 A 1/2007
JP 2008-152389 A 7/2008
(Continued)

*Primary Examiner* — Shardul Patel
(74) *Attorney, Agent, or Firm* — Sughrue Mion, PLLC

(57) ABSTRACT

A driving assistance apparatus includes: a moving-body-information acquiring unit configured to acquire moving-body information including a position and a speed vector of a moving body existing laterally ahead of own vehicle; an assistance-target determining unit configured to determine an assistance target approaching from a lateral direction with respect to a travelling direction of the own vehicle; a movement-point predicting unit configured to use the speed vector of the moving body to predict a future movement point; a detection-range changing unit configured to change the detection range by adding a change region to include the movement point along a moving direction indicated by the speed vector at a time the movement point is out of the detection range; and an assistance performing unit configured to perform driving assistance on an assistance target including the moving body determined as the assistance target within a changed detection range.

8 Claims, 7 Drawing Sheets

(51) Int. Cl.
  *B60W 30/095* (2012.01)
  *G01S 13/86* (2006.01)

(56) References Cited

U.S. PATENT DOCUMENTS

| | | | |
|---|---|---|---|
| 2005/0137758 A1* | 6/2005 | He | G01C 23/005 701/3 |
| 2007/0145818 A1* | 6/2007 | Kobayashi | B60T 7/22 303/113.4 |
| 2009/0201193 A1* | 8/2009 | Hilsebecher | G01S 13/347 342/109 |
| 2009/0271071 A1* | 10/2009 | Buerkel | B60T 8/17557 701/41 |
| 2011/0103650 A1* | 5/2011 | Cheng | B60R 1/00 382/104 |
| 2012/0029730 A1* | 2/2012 | Nagura | F02N 11/0837 701/2 |
| 2013/0088578 A1* | 4/2013 | Umezawa | G06T 7/0075 348/47 |
| 2013/0110316 A1* | 5/2013 | Ogawa | G08G 1/096716 701/1 |
| 2014/0333467 A1* | 11/2014 | Inomata | G01S 13/867 342/27 |
| 2015/0006014 A1* | 1/2015 | Wimmer | B60W 50/00 701/23 |
| 2015/0329046 A1* | 11/2015 | Igarashi | G08G 1/165 340/435 |

FOREIGN PATENT DOCUMENTS

| | | |
|---|---|---|
| JP | 2011-008571 A | 1/2011 |
| JP | 2011-070384 A | 4/2011 |
| JP | 2011-253241 A | 12/2011 |
| JP | 2012-027698 A | 2/2012 |
| JP | 2014-090426 | 4/2014 |
| JP | 2015-210588 A | 11/2015 |

\* cited by examiner

DRIVING ASSISTANCE APPARATUS

CROSS-REFERENCE TO RELATED APPLICATION(S)

The present application claims priority to and incorporates by reference the entire contents of Japanese Patent Application No. 2014-116212 filed in Japan on Jun. 4, 2014.

BACKGROUND OF THE INVENTION

1. Field of the Invention

The present invention relates to a driving assistance apparatus.

2. Description of the Related Art

Conventionally, there is reported a technique that monitors a moving body existing laterally ahead of a vehicle in an intersection or similar place using a peripheral detection sensor such as a radar (for example, in Japanese Patent Application Laid-open No. 2008-152389 and Japanese Patent Application Laid-open No. 2011-253241). This conventional technique changes the preliminarily set detection range of the peripheral detection sensor as necessary corresponding to the distance between the moving body to be the assistance target of driving assistance and own vehicle on which the peripheral detection sensor is mounted, and monitors the moving body of the assistance target within the changed detection range.

Now, in the conventional technique (for example, in Japanese Patent Application Laid-open No. 2008-152389 and Japanese Patent Application Laid-open No. 2011-253241), in the case where the moving body of the assistance target moves in a direction different from the initially assumed direction even when the detection range is changed corresponding to the distance between the moving body as the assistance target and the own vehicle, the assistance target to be monitored might become out of the changed detection range in the course of movement.

Here, in driving assistance in an intersection, the direction in which the assistance target to be monitored approaches the own vehicle can be roughly assumed based on traffic accident statistics in the past and Road Structure Ordinance. However, in practice, there are a lot of unexpected road structures and movements of the moving body.

For example, as illustrated in FIG. 1, assume that the situation where a moving body to be the assistance target of driving assistance (in FIG. 1, the other person's vehicle approaching the own vehicle from the right side of the own vehicle) is monitored using a peripheral detection sensor. The peripheral detection sensor allows detection within the detection range set to include a predetermined region laterally ahead of the own vehicle (in FIG. 1, the ribbon-shaped region that is centered on the front side of the own vehicle and expands in the right-left direction). In the situation illustrated in FIG. 1, the moving body existing in the position out of the detection range of the peripheral detection sensor (in FIG. 1, out of the ribbon-shaped region) can be removed from the assistance target of the driving assistance so as to reduce the unnecessary driving assistance.

However, for example, as illustrated in FIG. 2, in the case where a moving body (in FIG. 2, the pedestrian crossing at the crosswalk that continues from the right side obliquely to the left side of the own vehicle) moves not along a predetermined region (in FIG. 2, a ribbon-shaped region) that is set assuming the installation angle of the road in the intersection, the moving body might become out of the detection range of the peripheral detection sensor as a result of movement of the moving body as the assistance target to be monitored. In addition to this situation illustrated in FIG. 2, also in the situation of the encounter with an intersection having an exceptional road intersecting angle or in the situation where the own vehicle approaches an intersection at a certain angle, the assistance target to be monitored might become out of the detection range.

Therefore, it is possible to extend the sensor range so as to reliably monitor the assistance target to be monitored. However, the moving body other than the assistance target to be monitored might be unnecessarily detected. Accordingly, it is not preferred to extend the detection range of the peripheral detection sensor without careful consideration.

There is a need for a driving assistance apparatus that allows suitably changing a detection range of a peripheral detection sensor to include the future movement point of a moving body of an assistance target without unnecessarily detecting a moving body other than the assistance target.

SUMMARY OF THE INVENTION

It is an object of the present invention to at least partially solve the problems in the conventional technique.

According to one aspect of the present invention, there is provided a driving assistance apparatus including: a moving-body-information acquiring unit configured to acquire, from a peripheral detection sensor that allows detection within a detection range, moving-body information including a position and a speed vector of a moving body existing laterally ahead of own vehicle on which the driving assistance apparatus is mounted, the detection range being set to include a predetermined region laterally ahead of the own vehicle; an assistance-target determining unit configured to determine an assistance target approaching from a lateral direction with respect to a travelling direction of the own vehicle based on the position and the speed vector of the moving body included in the moving-body information; a movement-point predicting unit configured to use the speed vector of the moving body determined as the assistance target by the assistance-target determining unit to predict a future movement point to which the moving body of the assistance target moves after passage of a predetermined time from a current position corresponding to the position of the moving body; a detection-range changing unit configured to change the detection range by adding a change region to include the movement point along a moving direction indicated by the speed vector at a time the movement point is out of the detection range of the peripheral detection sensor; and an assistance performing unit configured to perform driving assistance on an assistance target including the moving body determined as the assistance target within a changed detection range.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, a description will be given of an embodiment of a driving assistance apparatus according to the present invention in detail based on the accompanying drawings. This embodiment does not limit the invention. The constituent elements in the embodiment described below include various modifications that will readily occur to those skilled in the art or modifications substantially similar thereto.

Figure 3:
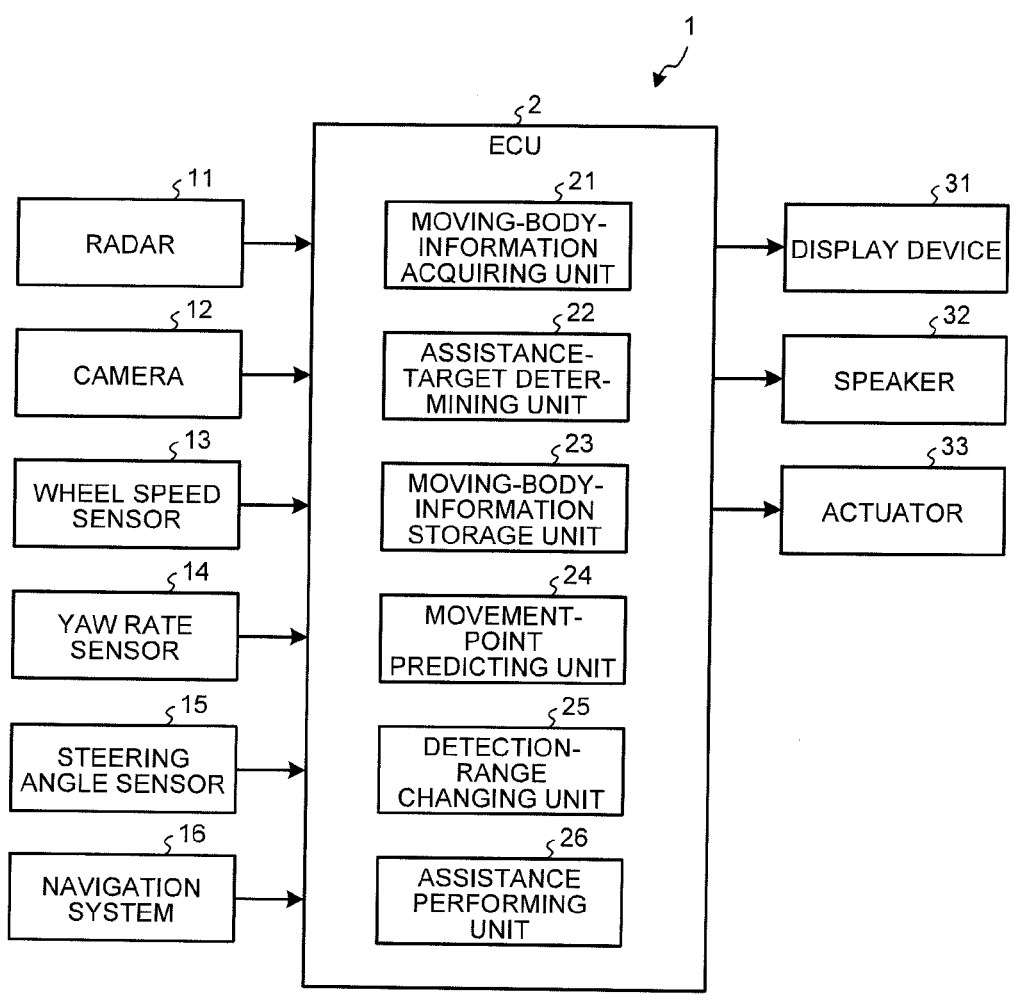
FIG. 3 is a diagram illustrating an exemplary configuration of a driving assistance apparatus according to an embodiment of the present invention.

A description will be given of the configuration of the driving assistance apparatus according to the embodiment of the present invention with reference to FIG. 3 to FIG. 10. FIG. 3 is a block diagram illustrating an exemplary configuration of the driving assistance apparatus according to the embodiment of the present invention.

As illustrated in FIG. 3, a driving assistance apparatus 1 according to this embodiment includes an ECU 2, a radar 11, a camera 12, a wheel speed sensor 13, a yaw rate sensor 14, a steering angle sensor 15, a navigation system 16, a display device 31, a speaker 32, and an actuator 33. This driving assistance apparatus 1 is mounted on a vehicle (own vehicle).

The ECU 2 couples to the radar 11 as a sensor for measuring the surrounding environment. The radar 11 is a device for detecting the object at the vicinity of the own vehicle. The vicinity of the own vehicle means at least the front, and the objects on the side and on the back can also be detected as necessary. The radar 11 can employ, for example, a laser radar and a millimeter-wave radar. The radar 11 transmits an electromagnetic wave (including a radio wave and a light wave (laser)) while scanning within the detection range of the radar 11 and receives the reflected wave that reflects and returns from the object, so as to detect information related to the transmission and reception. Then, the radar 11 transmits the detected transmission/reception information to the ECU 2 as a radar signal.

Figure 1:
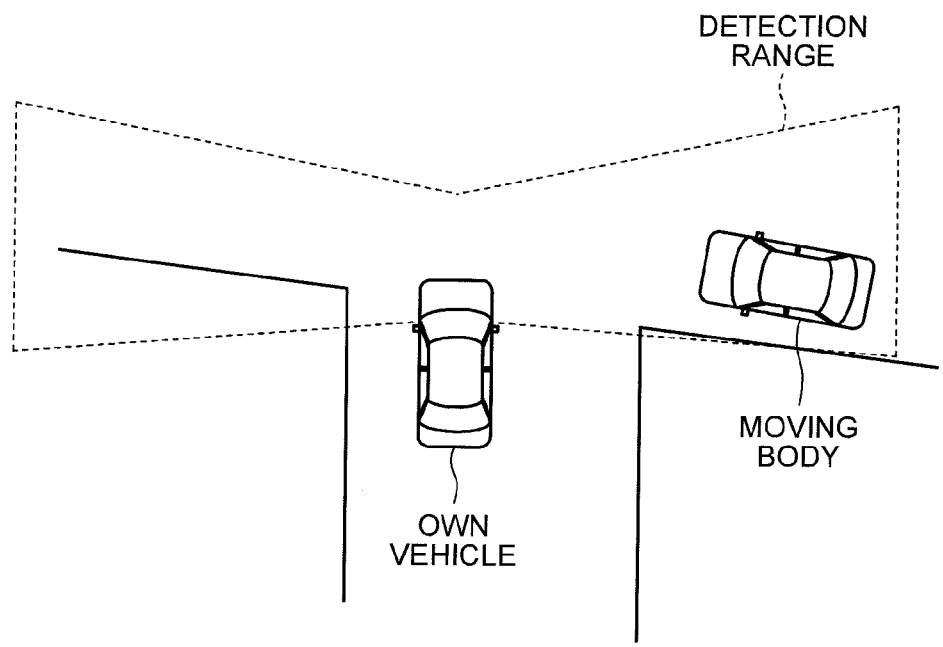
FIG. 1 is a diagram illustrating an exemplary situation that allows driving assistance in an intersection.
Figure 2:
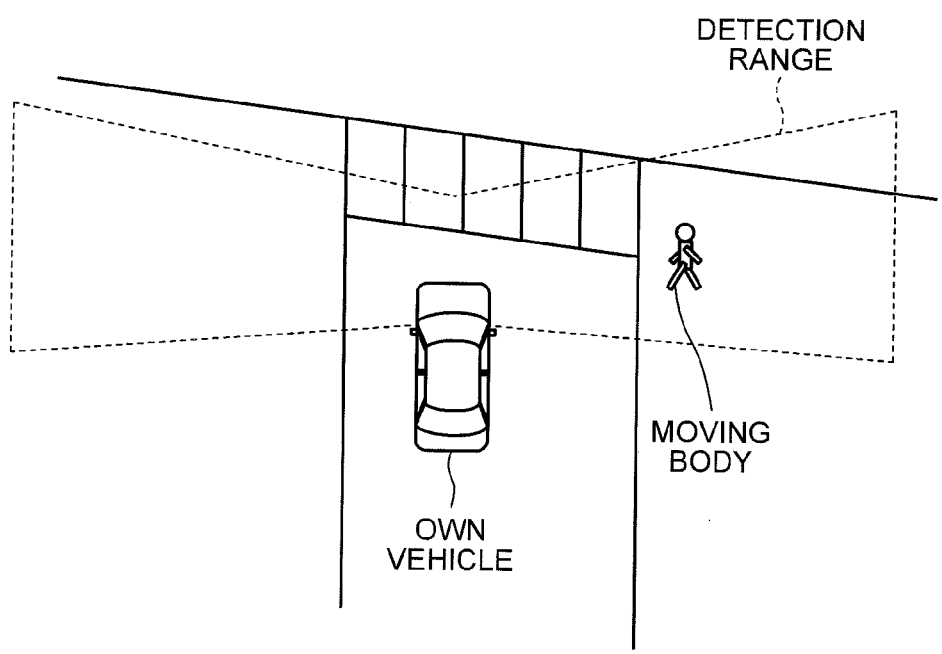
FIG. 2 is a diagram illustrating an exemplary situation that does not allow driving assistance in an intersection.

In this embodiment, the radar 11 functions as a peripheral detection sensor that allows detection within the detection range set to include a predetermined region laterally ahead of the own vehicle. For example, the predetermined region laterally ahead of the own vehicle may be a ribbon-shaped region that is centered on the front side of the own vehicle and expands in the right-left direction as illustrated in FIG. 1 or may be a rectangular-shaped region that is centered on the front side of the own vehicle and extends in the right-left direction. The shape and the range of this predetermined region are preliminary set taking into consideration the result of traffic accident statistics, Road Structure Ordinance, the reliability of the sensor, and similar parameter. Here, the shape and the range of the predetermined region are not limited to those of the ribbon-shaped region and the rectangular-shaped region described above insofar as the shape and the range allow easily detecting the region that is laterally ahead of the vehicle and where an assistance target is likely to exist assuming driving assistance in an intersection or similar place.

The ECU 2 couples to the camera 12 as a sensor for taking an image of the surrounding environment. The camera 12 has a function as a device for detecting an object at the vicinity of the own vehicle similarly to the radar 11, based on the taken image where the surrounding environment is taken. In this embodiment, the camera 12 may be used as a peripheral detection sensor that can take an image within an imaging range set to include the predetermined region laterally ahead of the own vehicle.

The ECU 2 also couples to the wheel speed sensor 13, the yaw rate sensor 14, and the steering angle sensor 15. The wheel speed sensor 13 is a sensor that detects the rotation speed of the wheel of the own vehicle. The wheel speed sensor 13 transmits the detected rotation speed of the wheel to the ECU 2 as a wheel speed signal. The yaw rate sensor 14 is a sensor that detects the yaw rate of the own vehicle. The yaw rate sensor 14 transmits the detected yaw rate to the ECU 2 as a yaw rate signal. The steering angle sensor 15 is a sensor that detects a steering angle of the own vehicle. For example, the steering angle sensor 15 detects a rotation angle (steering angle) of a steering shaft so as to detect a steering angle of the own vehicle. The steering angle sensor 15 transmits the detected steering angle to the ECU 2 as a steering angle signal.

Further, the ECU 2 couples to the navigation system 16. The navigation system 16 guides the own vehicle to a predetermined destination as a basic function. The navigation system 16 includes at least an information storage medium, an arithmetic processing unit, and an information detection device. The information storage medium stores map information required for running of the vehicle. The arithmetic processing unit computes route information from the own vehicle to the predetermined destination. The information detection device includes a GPS antenna, a GPS receiver, and similar member for detecting the current position of the own vehicle, the road condition, and similar value with radio navigation. In this embodiment, the map information stored in the information storage medium includes, for example, at least information related to a road structure of the intersection and similar structure. The navigation system 16 transmits various information obtained in the arithmetic processing unit, the information storage medium, the information detection device, and similar member to the ECU 2. In this embodiment, the various information transmitted to the ECU 2 from the navigation system 16 includes, for example, the route information from the own vehicle to the predetermined destination, the map information including at least the information related to the road structure, the location information of the own vehicle, and similar information. However, the various information is not limited to these.

The display device 31 is a display installed within the vehicle, and displays various information corresponding to a driving assistance signal output from the ECU 2 so as to notify the driver. The speaker 32 outputs predetermined audio corresponding to the driving assistance signal from the ECU 2. As just described, the display device 31 and the speaker 32 display a screen and output audio as a human machine interface (HMI) such as a head-up display (HUD). The actuator 33 is a brake actuator, an accelerator actuator, or a steering actuator that intervenes in the driving operation of the driver based on the driving assistance signal from the ECU 2 so as to drive the brake, the accelerator, or the steering of the own vehicle. While not illustrated here, a vibration device may be mounted in a predetermined position such as the steering wheel and the driving seat in this embodiment. In this case, the vibration device vibrates the steering wheel or the driving seat corresponding to the driving assistance signal output from the ECU 2 so as to allow drawing the driver's attention.

The ECU 2 includes a central processing unit (CPU), various memories, and similar member, and integrally controls the driving assistance apparatus 1. The ECU 2 loads the respective application programs stored in the memory and causes the CPU to execute the application programs so as to configure a moving-body-information acquiring unit 21, an assistance-target determining unit 22, a moving-body-information storage unit 23, a movement-point predicting unit 24, a detection-range changing unit 25, and an assistance performing unit 26. Here, in this embodiment, the moving-body-information acquiring unit 21 corresponds to the moving-body-information acquiring unit described in the claims. The assistance-target determining unit 22 corresponds to the assistance-target determining unit. The moving-body-information storage unit 23 corresponds to the moving-body-information storage unit. The movement-point predicting unit 24 corresponds to the movement-point predicting unit. The detection-range changing unit 25 corresponds to the detection-range changing unit. The assistance performing unit 26 corresponds to the assistance performing unit.

In the ECU 2, the moving-body-information acquiring unit 21 is a moving-body-information acquiring unit that acquires moving-body information including the position and the speed vector of the moving body existing laterally ahead of the own vehicle, from the peripheral detection sensor that allows detection within the detection range set to include the predetermined region laterally ahead of the own vehicle. In this embodiment, the peripheral detection sensor may be the radar 11 or may be the camera 12. Hereinafter, for convenience of explanation, a description will be given of the case where the peripheral detection sensor is the radar 11 as one example. Since the detection range of the radar 11 as the peripheral detection sensor is the range preliminarily set to include the predetermined region laterally ahead of the own vehicle, the information of the moving body acquired by the moving-body-information acquiring unit 21 is the moving-body information of the moving body existing laterally ahead of the own vehicle.

Specifically, the moving-body-information acquiring unit 21 detects the position of the object existing within the detection range based on the radar signal corresponding to the transmission/reception information of the electromagnetic wave detected by the radar 11 so as to recognize the object whose position changes within a predetermined period as a moving body, and then detects the position of this moving body. For example, the moving-body-information acquiring unit 21 detects the direction of the electromagnetic wave received by the radar 11, which is mounted on the own vehicle, as the direction in which the moving body exists based on the radar signal. Subsequently, the moving-body-information acquiring unit 21 detects the distance from the own vehicle to the moving body based on the time taken until the electromagnetic wave emitted to the direction in which the moving body exists reflects at the moving body and returns. Subsequently, the moving-body-information acquiring unit 21 detects the position of the moving body with respect to the own vehicle based on the direction in which the detected moving body exists and the distance from the own vehicle to the moving body. Further, the moving-body-information acquiring unit 21 measures the speed of the moving body. In this case, the moving-body-information acquiring unit 21 uses at least two points of the position of the detected moving body to measure the distance between the two points, and measures the speed of the moving body based on the time taken for the movement of the measured distance between the two points by the target moving body.

In this embodiment, the moving-body-information acquiring unit 21 acquires the position (X, Y) of the moving body thus detected and the speed vector (Vx, Yx) of the moving body determined corresponding to the position of the moving body and the speed and the moving direction of the moving body, as the moving-body information of the moving body. The speed vector is a vector that extends in the moving direction while the origin is the position of the moving body. The speed vector becomes a longer vector as the speed becomes faster while becoming a shorter vector as the speed becomes slower. In the case where the moving body moves while maintaining the current speed, the ending point of the speed vector is set to the predicted position as the position after passage of a predetermined time from the position of the moving body at present.

In the ECU 2, the assistance-target determining unit 22 is an assistance-target determining unit that determines the assistance target approaching from the lateral direction with respect to the travelling direction of the own vehicle based on the position and the speed vector of the moving body, which are included in the moving-body information of the moving body acquired by the moving-body-information acquiring unit 21. The assistance-target determining unit 22 determines the moving body that exists ahead of the own vehicle and approaches the own vehicle from the lateral direction, as the assistance target of the driving assistance. In this embodiment, the moving body includes, for example, the other person's vehicle as a vehicle other than the own vehicle, a motorcycle, a bicycle, a pedestrian, and similar moving body.

Figure 4:
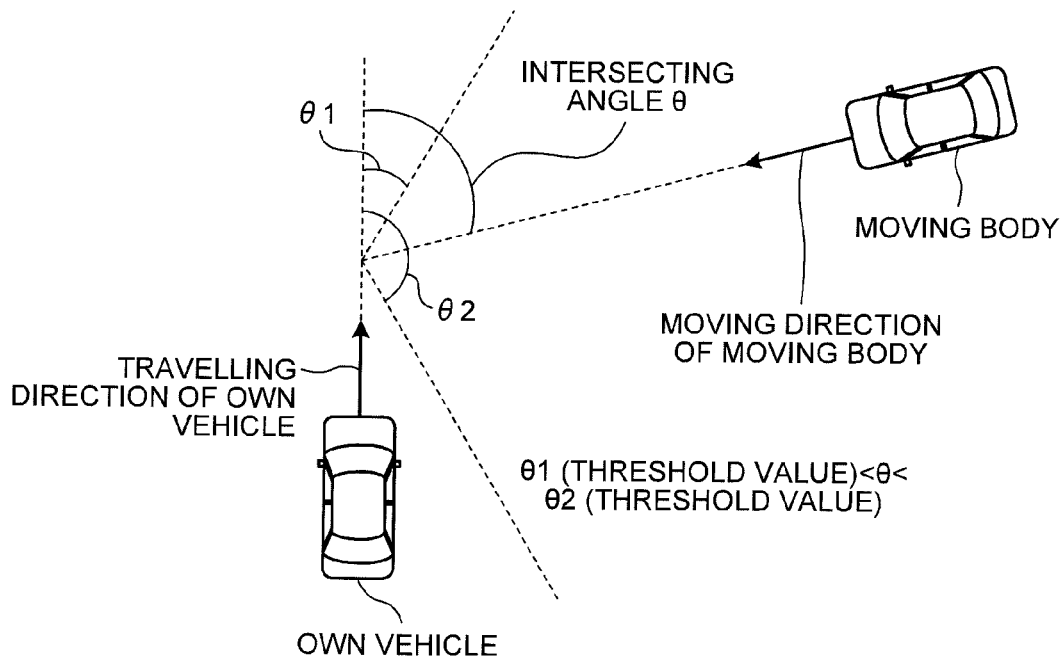
FIG. 4 is a diagram illustrating an exemplary refining process of an assistance target.
Figure 5:
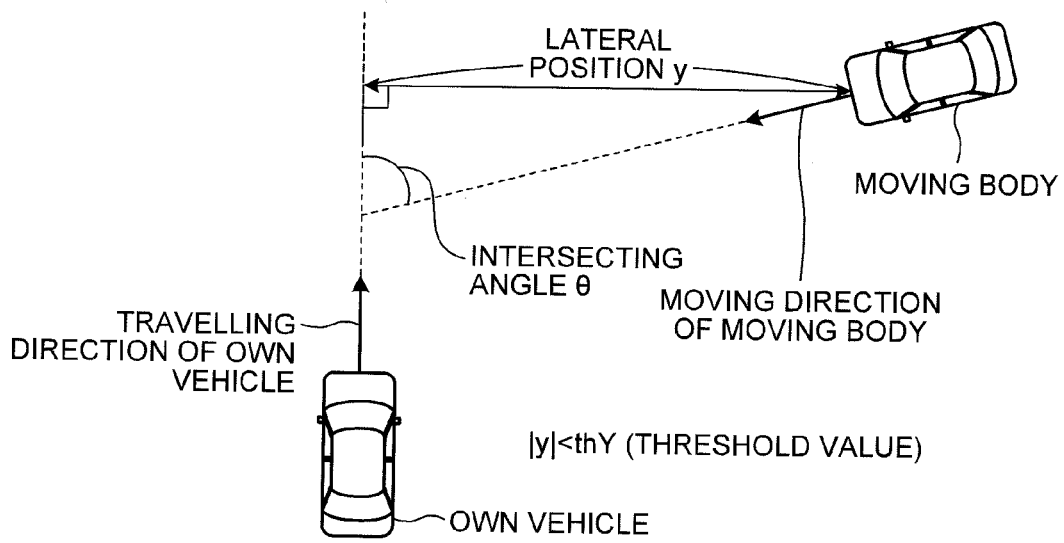
FIG. 5 is a diagram illustrating an exemplary refining process of the assistance target.

Here, a description will be given of an exemplary refining process of the assistance target performed by the assistance-target determining unit 22 with reference to FIG. 4 and FIG. 5. FIG. 4 and FIG. 5 are diagrams illustrating an exemplary refining process of the assistance target.

As illustrated in FIG. 4, the assistance-target determining unit 22 calculates an intersecting angle θ formed by: the extended line of the moving direction of the moving body indicated by the speed vector of the moving body while the origin is the position of the moving body; and the extended line of the travelling direction of the own vehicle while the origin is the center of the vehicle-width direction of the own vehicle. Subsequently, the assistance-target determining unit 22 determines the moving body satisfying the condition where the intersecting angle θ is within a predetermined range (θ1<θ<θ2) as the assistance target of the driving assistance. Here, the travelling direction of the own vehicle is the direction indicated by the speed vector of the own vehicle similarly to the moving direction of the moving body. The speed vector of the own vehicle is also determined corresponding to the position of the own vehicle and the speed and the travelling direction of the own vehicle. Here, in this embodiment, the position of the own vehicle is measured by the ECU 2 using an own-vehicle-position specifying device such as a global positioning system (GPS) included in the navigation system 16, which is mounted on the own vehicle. The speed of the own vehicle is measured by the ECU 2 based on the wheel speed signal corresponding to the rotation speed of the wheel detected by the wheel speed sensor 13.

In this embodiment, a lower-limit threshold value θ1 and an upper-limit threshold value θ2, which specify the predetermined range of the intersecting angle θ, are set to the angles to the extent that the moving body approaching the own vehicle from the direction other than the lateral direction can be removed from the assistance target. For example, in the case of the moving body as the other person's vehicle other than the own vehicle, the angle of the threshold value θ1 is set to the angle that allows discriminating between at least the oncoming vehicle approaching the own vehicle from the front side and the vehicle approaching the own vehicle from the lateral direction of the vehicle. The angle of the threshold value 92 is set to the angle that allows discriminating between at least the following vehicle approaching from the back side of the own vehicle and the vehicle approaching the own vehicle from the lateral direction of the vehicle.

Further, as illustrated in FIG. 5, the assistance-target determining unit 22 may determine the moving body satisfying the condition where a lateral position y of the moving body with respect to the own vehicle is within a predetermined threshold value (|y|<thY) as the assistance target, in addition to the condition where the intersecting angle θ is within the predetermined range (θ1<θ<θ2). Specifically, the assistance-target determining unit 22 calculates the intersecting angle θ formed by: the extended line of the moving direction of the moving body indicated by the speed vector of the moving body while the origin is the position of the moving body; and the extended line of the travelling direction of the own vehicle while the origin is the center of the vehicle-width direction of the own vehicle. Subsequently, the assistance-target determining unit 22 determines the moving body that satisfies the condition where the intersecting angle θ is within the predetermined range (θ1<θ<θ2) and satisfies the condition where the lateral position y is within the predetermined threshold value (|y|<thY), as the assistance target. In this embodiment, the lateral position y is the distance corresponding to the shortest distance from the extended line indicative of the travelling direction of the own vehicle to the position of the moving body. The predetermined threshold value thY is set to the distance to the extent that the assistance target can exclude the moving body that is less likely to collide with the own vehicle due to a relatively large distance from the own vehicle among the moving bodies approaching the own vehicle from the lateral direction.

Referring again to FIG. 3, in the ECU 2, the moving-body-information storage unit 23 is a moving-body-information storage unit that stores the moving-body information of the moving body determined as the assistance target in association with the time and/or the position. Specifically, the moving-body-information storage unit 23 stores the moving-body information of the moving body determined as the assistance target by the assistance-target determining unit 22 in association with the time and/or the position in the determination of the assistance target within the memory of the ECU 2 for accumulation. In addition, the moving-body-information storage unit 23 may transmit the moving-body information of the moving body determined as the assistance target to an external database device or similar device that can be communicatively coupled via the communication device (not illustrated) mounted on the own vehicle, so as to store the moving-body information within this database for accumulation. In this embodiment, the moving-body information stored by the moving-body-information storage unit 23 is referenced as data for securing the reliability of the prediction result of the movement point by the movement-point predicting unit 24 described below.

In the ECU 2, the movement-point predicting unit 24 is a movement-point predicting unit that uses the speed vector of the moving body determined as the assistance target by the assistance-target determining unit 22 to predict the future movement point to which the moving body of the assistance target moves after passage of a predetermined time from the current position corresponding to the position of the moving body.

Figure 6:
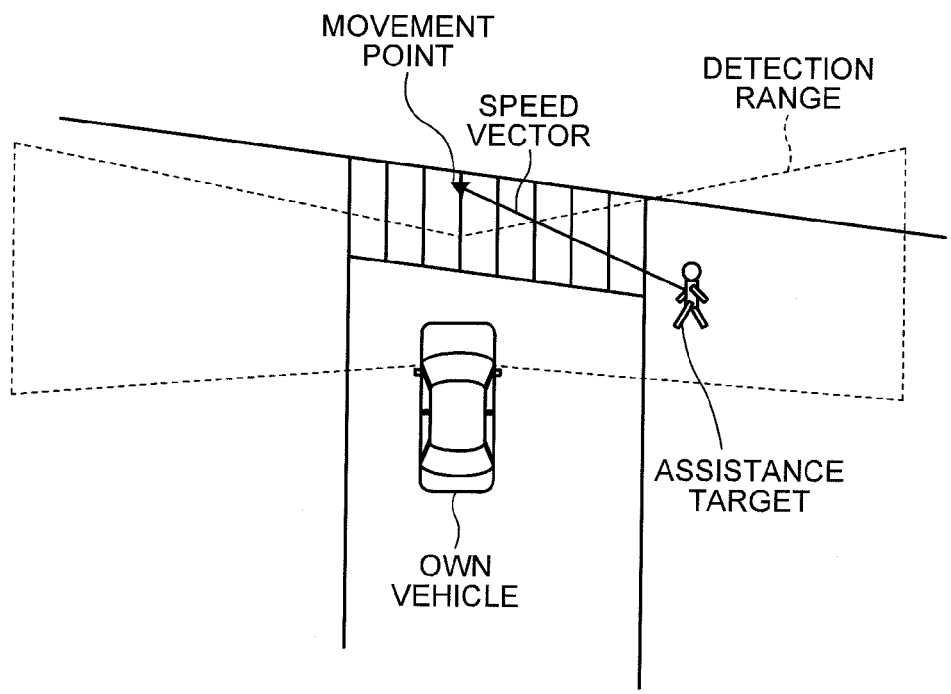
FIG. 6 is a diagram illustrating an exemplary process for predicting a movement point using a speed vector of a single moving body.

As one example, a description will be given of the content of the process executed by the movement-point predicting unit 24 in this case with reference to FIG. 6. FIG. 6 is a diagram illustrating an exemplary process for predicting a movement point using a speed vector of a single moving body. For example, as illustrated in FIG. 6, the movement-point predicting unit 24 uses the speed vector (in FIG. 6, the vector extending from the right side of the own vehicle obliquely to the left direction) of the moving body included in the moving-body information of the moving body (in FIG. 6, the pedestrian existing on the right side of the own vehicle) determined as the assistance target by the assistance-target determining unit 22, to predict the position of the ending point of the speed vector (in FIG. 6, the position of the distal end of the arrow as the speed vector) as the movement point to which the moving body of the assistance target moves after passage of a predetermined time from the present.

Here, the movement-point predicting unit 24 may search the moving-body information stored in association with the time identical to the current time and/or the position identical to the current position from the moving-body-information storage unit 23 and use the speed vector included in the searched moving-body information, to predict the movement point. The current time corresponds to the time when the movement point is predicted. The current position corresponds to the position of the own vehicle when the movement point is predicted.

For example, in the case where the speed vector included in the past moving-body information stored by the moving-body-information storage unit 23 is used, the movement-point predicting unit 24 executes the process described as follows. Firstly, the movement-point predicting unit 24 generates a first prediction result where the position of the ending point of the speed vector included in the moving-body information determined as the assistance target at present is predicted as the movement point. Subsequently, the movement-point predicting unit 24 searches the moving-body information of the moving body stored in the past than the present by the moving-body-information storage unit 23, at the time identical to the time when this first prediction result is generated and/or in the position identical to the position where this first prediction result is generated. Subsequently, in the case where the movement-point predicting unit 24 can search the moving-body information of the moving body stored at the identical time and/or the identical position when the first prediction result is generated, the movement-point predicting unit 24 generates a second prediction result where the position of the ending point of the speed vector included in the searched moving-body information is predicted as the movement point. Subsequently, the movement-point predicting unit 24 generates the comparison result where the first prediction result and the second prediction result are compared with each other. In this embodiment, based on this comparison result, in the case where it is determined that both the movement points coincide with each other, or in the case where it is determined that both the movement points do not coincide with each other but the movement point included in the second prediction result exists within a predetermined range from the movement point included in the first prediction result, the ECU 2 determines that the movement point is included in the first prediction result is a right result and uses this movement point in the next process. On the other hand, in the case where it is determined that both the movement points do not coincide with each other and the movement point included in the second prediction result is not within the predetermined range from the movement point included in the first prediction result, the ECU 2 determines that the movement point included in the first prediction result is a false result and does not use this movement point in the next process.

In the case where there are a plurality of moving bodies, which move in the direction within a predetermined angle range with respect to the moving direction of the assistance target, at the vicinity of the moving body determined as the assistance target, the movement-point predicting unit 24 may use the average speed vector based on the speed vectors included in the moving-body information of the plurality of moving bodies to predict the movement point.

Figure 7:
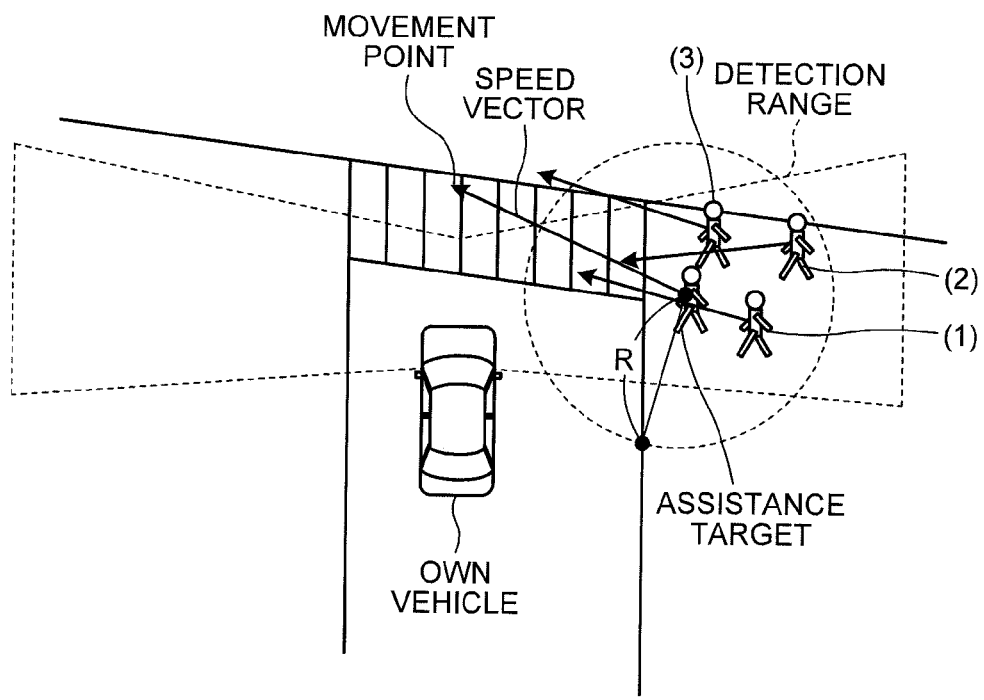
FIG. 7 is a diagram illustrating an exemplary process for predicting the movement point using speed vectors of a plurality of moving bodies.

As one example, a description will be given of the content of the process executed by the movement-point predicting unit 24 in this case with reference to FIG. 7. FIG. 7 is a diagram illustrating an exemplary process for predicting the movement point using speed vectors of a plurality of moving bodies. For example, as illustrated in FIG. 7, the movement-point predicting unit 24 determines whether there are two or more other moving bodies within a predetermined radius R (m) centering on the position of a moving body as the assistance target (in FIG. 7, the position of the pedestrian in the position at the shortest distance from the own vehicle among the pedestrians existing on the right side of the own vehicle). In the case where it is determined that there are two or more other moving bodies within the predetermined radius R centering on the position of the moving body as the assistance target, the movement-point predicting unit 24 further determines whether the moving directions indicated by the speed vectors of these plurality of moving bodies (in FIG. 7, the other three pedestrians (1) to (3) existing at the vicinity of the assistance target) are within a predetermined angle range with respect to the moving direction indicated by the speed vector of the moving body as the assistance target. The predetermined angle range is set to an angle range to the extent that can be determined as approximately the direction identical to the moving direction of the assistance target. Subsequently, in the case where it is determined that the moving directions are within the predetermined angle range, the movement-point predicting unit 24 determines that there are a plurality of moving bodies, which move in the direction within the predetermined angle range with respect to the moving direction of the assistance target, at the vicinity of the moving body determined as the assistance target.

For example, in the case where the speed vectors included in the moving-body information of the plurality of moving bodies are used, the movement-point predicting unit 24 executes the process described as follows. The movement-point predicting unit 24 calculates an average speed vector (Vxave, Vyave) as the averaged result of: the speed vector included in the moving-body information determined as the assistance target, and the speed vectors included in the moving-body information of the plurality of moving bodies existing at the vicinity of the assistance target. The average speed vector is a vector that extends to the average moving direction as the averaged result of the angles of the moving directions indicated by the respective speed vectors while the origin is the average position (Xave, Yave) as the averaged result of: the position of the assistance target, and the respective positions of the plurality of moving bodies existing at the vicinity of the assistance target. The length of the average speed vector is the length corresponding to the average speed as the averaged result of the magnitudes of the speeds indicated by the lengths of the respective speed vectors.

Figure 8:
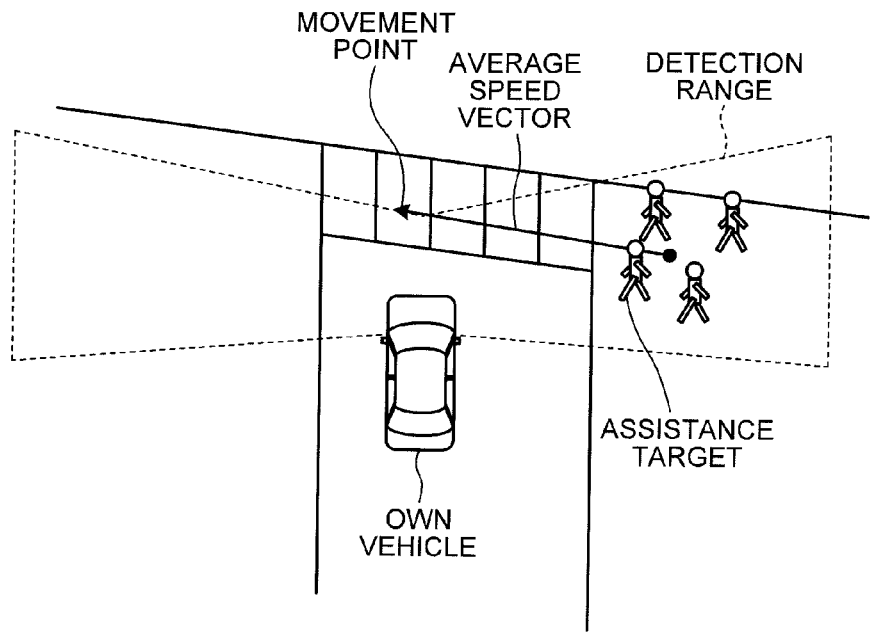
FIG. 8 is a diagram illustrating an exemplary average vector.

As one example, a description will be given of the content of the process executed by the movement-point predicting unit 24 based on the average speed vector with reference to FIG. 8. FIG. 8 is a diagram illustrating an exemplary average vector. For example, as illustrated in FIG. 8, the movement-point predicting unit 24 predicts the position of the ending point of the calculated average speed vector (in FIG. 8, the position at the distal end of the arrow as the average speed vector) as the movement point to which the moving body of the assistance target moves after passage of a predetermined time from the present.

Referring again to FIG. 3, in the ECU 2, the detection-range changing unit 25 is a detection-range changing unit that adds a change region to include the movement point along the moving direction indicated by the speed vector (or the average speed vector) so as to change the detection range of the peripheral detection sensor in the case where the movement point predicted by the movement-point predicting unit 24 is out of the detection range of the peripheral detection sensor.

Figure 9:
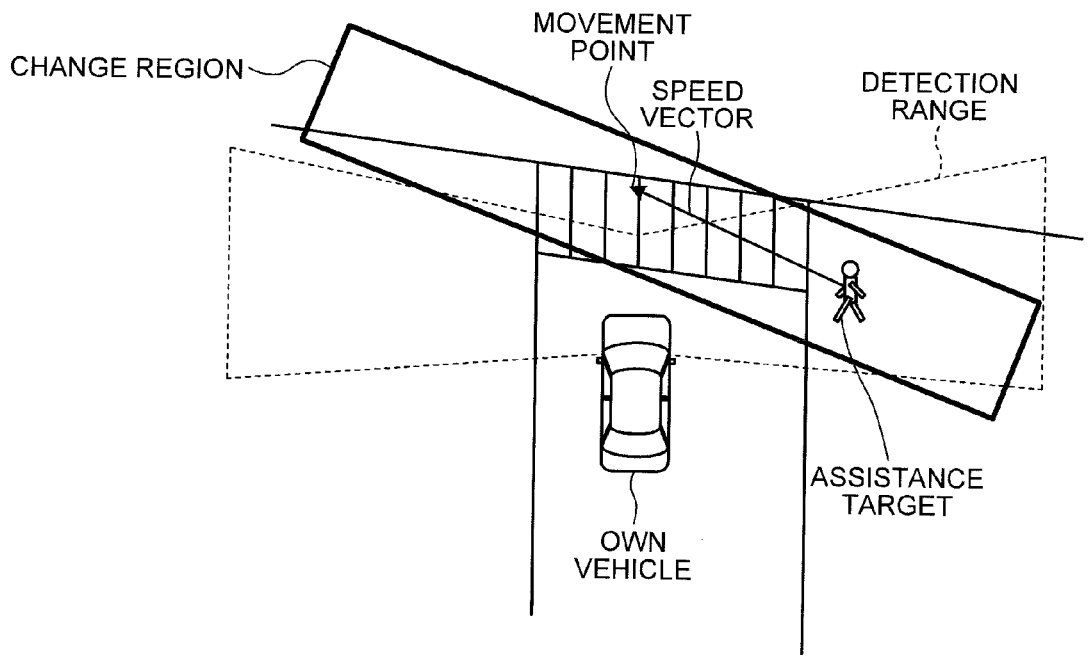
FIG. 9 is a diagram illustrating an exemplary process for changing a detection range.

FIG. 9 is a diagram illustrating an exemplary process for changing the detection range. For example, as illustrated in FIG. 9, in the case where the movement point corresponding to the ending point of the speed vector as the assistance target is out of the detection range of the peripheral detection sensor of the own vehicle, the detection-range changing unit 25 changes the detection range by adding a new change region to include the movement point along the moving direction indicated by the speed vector so as not to cause the gap with the existing detection range. Here, the detection-range changing unit 25 may change the setting parameter, which specifies the existing detection range, such that the existing detection range has the shape and the size in the state where the new change region is added. While not illustrated here, similarly in the case where the average speed vector of the assistance targets is used, when the movement point corresponding to the ending point of the average speed vector as the assistance targets is out of the detection range of the peripheral detection sensor of the own vehicle, the detection-range changing unit 25 changes the detection range by adding a new change region to include the movement point along the moving direction indicated by the average speed vector.

Specifically, in the case where the movement point is out of the detection range, the detection-range changing unit 25 predicts a collision point where the moving body of the assistance target and the own vehicle collide with each other using the moving-body information and adds a rectangular change region to a predetermined region so as to change the detection range. The change region is set to extend along the moving direction of the moving body as the assistance target and the opposite direction of this moving direction while the center is the collision point.

Figure 10:
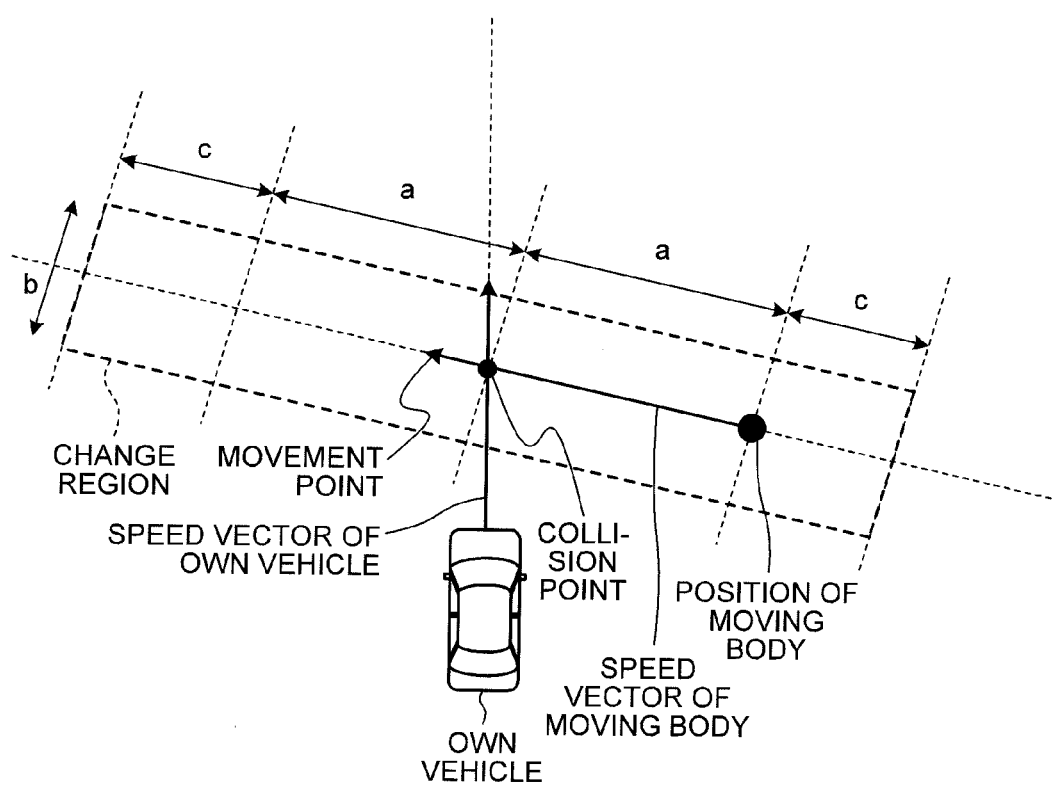
FIG. 10 is a diagram illustrating an exemplary process for setting a change region.

FIG. 10 is a diagram illustrating an exemplary process for setting the change region. For example, as illustrated in FIG. 10, the detection-range changing unit 25 predicts the point where the speed vector of the moving body as the assistance target and the speed vector of the own vehicle intersect with each other, as the collision point. While not illustrated here, the detection-range changing unit 25 may predict the point where the average speed vector based on: the speed vector of the moving body as the assistance target; and the speed vectors of a plurality of moving bodies at the vicinity of the assistance target; intersects with the speed vector of the own vehicle, as the collision point. After the collision point is predicted, the detection-range changing unit 25 calculates the distance a from the position of the predicted collision point to the position of the moving body along the opposite direction of the moving direction indicated by the speed vector of the moving body. Further, the detection-range changing unit 25 calculates a distance c corresponding to a half distance of the distance a. These distance a and distance c are used to set the width in the longitudinal direction of the rectangular change region as illustrated in FIG. 10. The detection-range changing unit 25 also sets a distance b as the width in the short direction of the rectangular change region. This distance b is set corresponding to the attribution of the moving body estimated based on the speed and the size of the moving body detected by the peripheral detection sensor. For example, in the case where the attribution of the moving body is the other person's vehicle, a relatively longish width is needed since a largish object moves at a fast speed. Accordingly, the distance b is set to be long. For example, in the case where the attribution of the moving body is the pedestrian, a relatively shortish width is sufficient since a smallish object moves at a slow speed. Accordingly, the distance b is set to be short. The detection-range changing unit 25 uses the distance a, the distance b, and the distance c thus obtained, to set the rectangular change region (the rectangular region with a longitudinal width of b and a lateral width of 2a+2c) as illustrated in FIG. 10. This rectangular change region includes the movement point corresponding to the ending point of the speed vector of the moving body. The change region is set to be bilaterally symmetric centering on the collision point, taking into consideration the possibility that there is a moving body moving toward the opposite direction of the moving direction of the moving body.

Referring again to FIG. 3, the assistance performing unit 26 is an assistance performing unit that performs the driving assistance on the assistance target including the moving body determined as the assistance target within the detection range changed by the detection-range changing unit 25. The assistance performing unit 26 transmits the driving assistance signal, which corresponds to the content of the driving assistance, to the display device 31, the speaker 32, and the actuator 33 to control these members so as to perform the driving assistance. In this embodiment, the driving assistance includes the assistance indicating that the position of the assistance target exists in either of the right and left directions with respect to the own vehicle. For example, the assistance performing unit 26 notifies the driver about the existence of the assistance target in either of the right and left directions by indication for drawing the driver's attention displayed on the display, alarm sound output from the speaker, and similar method. In addition, the assistance performing unit 26 may intervene in the driving operation to drive the brake, the accelerator, or the steering of the own vehicle, so as to perform the driving assistance for avoiding the collision with the moving body determined as the assistance target.

Figure 11:
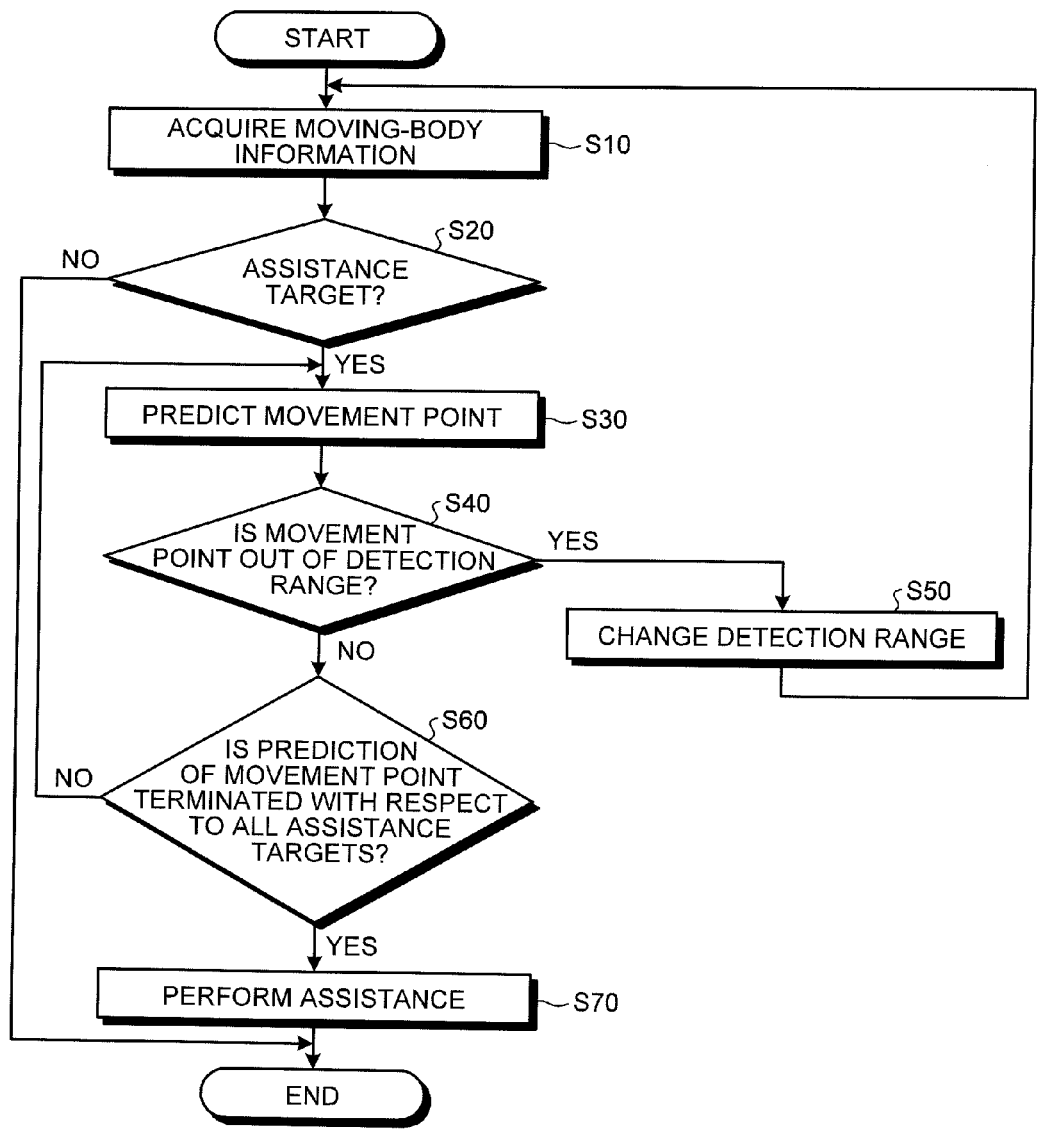
FIG. 11 is a flowchart illustrating an exemplary driving assistance process according to the embodiment of the present invention.

Next, a description will be given of an exemplary process executed by the driving assistance apparatus according to the embodiment of the present invention with reference to FIG. 11. FIG. 11 is a flowchart illustrating an exemplary driving assistance process according to the embodiment of the present invention. The following process illustrated in FIG. 11 is repeatedly executed for a short operation period at predetermined intervals.

As illustrated in FIG. 11, the moving-body-information acquiring unit 21 acquires the moving-body information including the position and the speed vector of the moving body that exists laterally ahead of the own vehicle, from the peripheral detection sensor that allows detection within the detection range set to include the predetermined region laterally ahead of the own vehicle (in step S10). Here, in step S10, the moving-body-information storage unit 23 stores the moving-body information of the moving body determined as the assistance target in association with the time and/or the position.

Subsequently, as illustrated in FIG. 4 and FIG. 5 above, the assistance-target determining unit 22 determines the assistance target approaching from the lateral direction with respect to the travelling direction of the own vehicle, based on the position and the speed vector of the moving body included in the moving-body information of the moving body acquired by the moving-body-information acquiring unit 21 in step S10 (in step S20).

In step S20, in the case where it is determined that the moving body from which the moving-body information is acquired is determined as the assistance target in step S10 (Yes in step S20), as illustrated in FIG. 6 above, the movement-point predicting unit 24 uses the speed vector of the moving body determined as the assistance target by the assistance-target determining unit 22 to predict the future movement point to which the moving body of the assistance target moves after passage of a predetermined time from the current position corresponding to the position of the moving body (in step S30). Here, in step S30, the movement-point predicting unit 24 may search the moving-body information stored in association with the time identical to the current time and/or the position identical to the current position from the moving-body-information storage unit 23 and uses the speed vector included in the searched moving-body information to predict the movement point. Also in step S30, as illustrated in FIG. 7 above, in the case where there are a plurality of moving bodies, which move in the direction within a predetermined angle range with respect to the moving direction of the assistance target, at the vicinity of the moving body determined as the assistance target, as illustrated in FIG. 8 above, the movement point may be predicted using the average speed vector based on the speed vectors included in the moving-body information of the plurality of moving bodies.

On the other hand, in step S20, in the case where the assistance-target determining unit 22 determines that the moving body is not the assistance target (No in step S20), the ECU 2 terminates this process.

After the process in step S30, the detection-range changing unit 25 determines whether the movement point predicted by the movement-point predicting unit 24 in step S30 is out of the detection range of the peripheral detection sensor (in step S40).

In step S40, in the case where it is determined that the movement point is out of the detection range (Yes in step S40), as illustrated in FIG. 9 above, the detection-range changing unit 25 changes the detection range of the peripheral detection sensor by adding the change region to include the movement point along the moving direction indicated by the speed vector (in step S50). Specifically, in step S50, the detection-range changing unit 25 changes the detection range by, as illustrated in FIG. 10 above, using the moving-body information to predict the collision point where the moving body of the assistance target and the own vehicle collide with each other and adding a rectangular change region to the predetermined region. The change region is set to extend along the moving direction of the moving body as the assistance target and the opposite direction of this moving direction while the center is the collision point. Subsequently, the process proceeds to the process in step S10.

On the other hand, in step S40, in the case where the detection-range changing unit 25 determines that the movement point is within the detection range (No in step S40), the assistance performing unit 26 determines whether or not the process for predicting the movement point in step S30 is performed on all the moving bodies determined as the assistance targets in step S20 before performing the driving assistance (in step S60).

In step S60, in the case where it is determined that the processing for predicting the movement point is not terminated with respect to all the assistance targets (No in step S60), the process returns to the process in step S30.

On the other hand, in step S60, in the case where it is determined that the process for predicting the movement point is terminated with respect to all the assistance targets (Yes in step S60), the assistance performing unit 26 performs the driving assistance on the moving body of the assistance target (in step S70). In step S70, the driving assistance to be performed includes the assistance indicating that the position of the assistance target exists in either of the right and left directions with respect to the own vehicle. As just described, the assistance performing unit 26 performs the driving assistance on the assistance target including the moving body determined as the assistance target within the changed detection range. Subsequently, this process terminates. Here, in this embodiment, the driving assistance apparatus may turn the detection range after being changed by addition of the change region back to the initial detection range preliminarily set after passage of a predetermined time.

Accordingly, the driving assistance apparatus according to the present invention allows setting the detection range to include the future movement point of the moving body taking into consideration the current moving direction of the moving body. This allows continuously detecting the moving body to be the assistance target with a higher probability than that of the conventional technique. The detection range is minimally expanded to have an appropriate form corresponding to the future movement point of the moving body. This allows ensuring a low probability of detecting an unnecessarily thing that is not suitable for the assistance target of the driving assistance.

In the conventional driving assistance apparatus that performs the driving assistance in the intersection, although a predetermined region to be the detection range of the peripheral detection sensor is preliminarily determined taking into consideration the road intersecting angle with a high encounter frequency, in the case where movement of the moving body such as the other person's vehicle and the pedestrian has a high degree of freedom, there occurs the situation where the driving assistance cannot be performed, for example, the moving body becomes out of the assumed predetermined region. In contrast, in the driving assistance apparatus of the present invention, the driving assistance can be performed by setting the variable detection range of the peripheral detection sensor corresponding to the speed vector of the moving body as the assistance target of the driving assistance.

As described above, the driving assistance apparatus according to the invention allows suitably changing the detection range of the peripheral detection sensor to include the future movement point of the moving body as the assistance target without unnecessarily detecting the moving body other than the assistance target.

The driving assistance apparatus according to the embodiment of the present invention provides the effect that allows suitably changing the detection range of the peripheral detection sensor to include the future movement point of the moving body as the assistance target without unnecessarily detecting the moving body other than the assistance target.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. A driving assistance apparatus, comprising:
a moving-body-information acquiring unit configured to acquire, from a peripheral detection sensor that allows detection within a detection range, moving-body information including a position and a speed vector of a moving body existing laterally ahead of own vehicle on which the driving assistance apparatus is mounted, the detection range being set to include a predetermined region laterally ahead of the own vehicle;
an assistance-target determining unit configured to determine an assistance target approaching from a lateral direction with respect to a travelling direction of the own vehicle based on the position and the speed vector of the moving body included in the moving-body information;
a movement-point predicting unit configured to use the speed vector of the moving body determined as the assistance target by the assistance-target determining unit to predict a future movement point to which the moving body of the assistance target moves after passage of a predetermined time from a current position corresponding to the position of the moving body;
a detection-range changing unit configured to change the detection range by adding a change region to include the movement point along a moving direction indicated by the speed vector at a time the movement point is out of the detection range of the peripheral detection sensor; and
an assistance performing unit configured to perform driving assistance on an assistance target including the moving body determined as the assistance target within a changed detection range.

2. The driving assistance apparatus according to claim 1, further comprising a moving-body-information storage unit configured to store the moving-body information of the moving body determined as the assistance target in association with at least one of a time and a position, wherein
the movement-point predicting unit is configured to:

search the moving-body information stored in association with at least one of a time identical to a current time and a position identical to a current position from the moving-body-information storage unit; and predict the movement point by using a speed vector included in the searched moving-body information.

3. The driving assistance apparatus according to claim 2, wherein at a time there are a plurality of moving bodies at a vicinity of the moving body determined as the assistance target and the plurality of moving bodies move in a direction within a predetermined angle range with respect to a moving direction of the assistance target, the movement-point predicting unit uses an average speed vector based on speed vectors included in the moving-body information of the plurality of moving bodies to predict the movement point.

4. The driving assistance apparatus according to claim 3, wherein at a time the movement point is out of the detection range, the detection-range changing unit changes the detection range by: using the moving-body information to predict a collision point where the moving body of the assistance target and the own vehicle collide with each other, and adding a rectangular change region to the predetermined region, the change region being set to extend along a moving direction of the moving body of the assistance target and an opposite direction of the moving direction while a center is the collision point.

5. The driving assistance apparatus according to claim 2, wherein at a time the movement point is out of the detection range, the detection-range changing unit changes the detection range by: using the moving-body information to predict a collision point where the moving body of the assistance target and the own vehicle collide with each other, and adding a rectangular change region to the predetermined region, the change region being set to extend along a moving direction of the moving body of the assistance target and an opposite direction of the moving direction while a center is the collision point.

6. The driving assistance apparatus according to claim 1, wherein at a time there are a plurality of moving bodies at a vicinity of the moving body determined as the assistance target and the plurality of moving bodies move in a direction within a predetermined angle range with respect to a moving direction of the assistance target, the movement-point predicting unit uses an average speed vector based on speed vectors included in the moving-body information of the plurality of moving bodies to predict the movement point.

7. The driving assistance apparatus according to claim 6, wherein at a time the movement point is out of the detection range, the detection-range changing unit changes the detection range by: using the moving-body information to predict a collision point where the moving body of the assistance target and the own vehicle collide with each other, and adding a rectangular change region to the predetermined region, the change region being set to extend along a moving direction of the moving body of the assistance target and an opposite direction of the moving direction while a center is the collision point.

8. The driving assistance apparatus according to claim 1, wherein at a time the movement point is out of the detection range, the detection-range changing unit changes the detection range by: using the moving-body information to predict a collision point where the moving body of the assistance target and the own vehicle collide with each other, and adding a rectangular change region to the predetermined region, the change region being set to extend along a moving direction of the moving body of the assistance target and an opposite direction of the moving direction while a center is the collision point.

\* \* \* \* \*